Patented Mar. 21, 1933

1,902,400

UNITED STATES PATENT OFFICE

WILHELM GLUUD, OF DORTMUND-EVING, GERMANY, ASSIGNOR TO GESELLSCHAFT FÜR KOHLENTECHNIK MIT BESCHRÄNKTER HAFTUNG, OF DORTMUND-EVING, GERMANY, A COMPANY OF GERMANY

PROCESS OF PRODUCING GUANIDINE-THIOCYANATE

No Drawing. Application filed December 3, 1931, Serial No. 578,745, and in Germany December 12, 1930.

It is known to produce guanidine-thiocyanate by heating ammonium-thiocyanate, but the yield of this process is poor, the process is tedious and its course is not uniform, as appears already from the fact that while a part of the sulphocyanate is destroyed carbon disulphide escapes in the form of ammonium-thiocarbonate under which term I comprehend the ammonium salt of the trithio-carbonic acid, the structure of which appears from the following formula pictures:

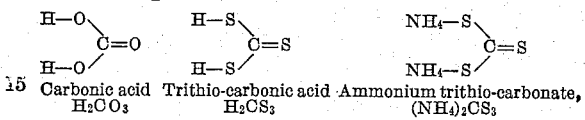

Carbonic acid  Trithio-carbonic acid  Ammonium trithio-carbonate,
$H_2CO_3$         $H_2CS_3$                $(NH_4)_2CS_3$ It has been endeavored to improve this reaction which is known since a long time by the process described in the German Patent 97,820, in which process salts or oxides of the heavy metals were added to the molten mass and simultaneously therewith ammonia was led therethrough. For the practical and economical manufacture of guanidine that process is, however, complicated, tedious and unsuited, because the addition of the salts or oxides of the heavy metals which are converted during the process into non-regenerable sulphides inspissates the molten mass and renders its manipulation difficult. Apart from these drawbacks, carrying out that process is rendered very difficult also when the molten mass is being worked owing to the troublesome filtering off of the sulphides formed, and undesired expenses are caused by the salts or oxides of the heavy metals used.

I have discovered that an addition of salts or oxides of heavy metals as proposed in said German patent is not requisite at all for the production of the guanidine-thiocyanate, and that a smooth course of the process, together with a good yield, can be obtained by conducting only ammonia through the molten mass, whereby a very considerable improvement over the process disclosed in the said German patent is attained, this improvement consisting therein that the tedious working with the inspissated molten mass, the separation of the sulphide and the regeneration of the same, can be dispensed with, or obviated respectively, and also the further advantage is attained that the reaction proceeds practically uniformly, as appears from the following example:

76 kg of ammonium-thiocyanate are heated to 170–180° and the molten mass is kept in this temperature for from 20 to 25 hours. Simultaneously therewith and while preferably the molten mass is agitated a moderate current of ammonia is conducted through said mass. The reaction proceeds fairly quantitatively according to the equation:

The sulphide of hydrogen arising during the process is conducted away by the current of ammonia, as already mentioned, and is separated in any desired manner, for instance by means of a gas purifying mass. The ammonia is conducted back to the molten mass in a circuit.

The yield of guanidine-rhodanide amounted to from 80 to 85% of the theoretical value, whereas parallel experiments carried out under the same conditions, but without the introduction of the ammonia, the yield in guanidine-rhodanide amounted to only 58%.

I claim:

1. The process of producing guanidine-thiocyanate, consisting in melting ammonium-thiocyanate and conducting ammonia through the molten mass.

2. The process of producing guanidine-thiocyanate, consisting in melting ammonium-thiocyanate, conducting ammonia through the molten mass, and agitating the latter while the ammonia is being conducted therethrough.

3. The process of producing guanidine-thiocyanate, consisting in melting ammonium-thiocyanate, conducting ammonia through the molten mass, removing the arising sulphide of hydrogen from the process and conducting the ammonia back into the molten mass in a circuit.

4. The process of producing guanidine-thiocyanate, consisting in melting ammonium-thiocyanate, conducting ammonia through the molten mass, separating the arising sulphide of hydrogen, and removing it from the process.

5. The process of producing guanidine-thiocyanate, consisting in melting ammonium-thiocyanate, conducting ammonia through the molten mass, removing the sulphide of hydrogen from the ammonia leaving the molten mass, and re-conducting the thus purified ammonia in a circuit back to said molten mass.

In testimony whereof I affix my signature.

WILHELM GLUUD.